US012340506B2

United States Patent
Hassanpour et al.

(10) Patent No.: US 12,340,506 B2
(45) Date of Patent: Jun. 24, 2025

(54) SYSTEM AND METHOD FOR ATTENTION-BASED CLASSIFICATION OF HIGH-RESOLUTION MICROSCOPY IMAGES

(71) Applicant: The Trustees of Dartmouth College, Hanover, NH (US)

(72) Inventors: Saeed Hassanpour, Hanover, NH (US); Naofumi Tomita, Hanover, NH (US)

(73) Assignee: The Trustees of Dartmouth College, Hanover, NH (US)

( * ) Notice: Subject to any disclaimer, the term of this patent is extended or adjusted under 35 U.S.C. 154(b) by 560 days.

(21) Appl. No.: 17/608,016

(22) PCT Filed: Apr. 8, 2020

(86) PCT No.: PCT/US2020/027178
§ 371 (c)(1),
(2) Date: Nov. 1, 2021

(87) PCT Pub. No.: WO2020/222985
PCT Pub. Date: Nov. 5, 2020

(65) Prior Publication Data
US 2022/0309653 A1      Sep. 29, 2022

Related U.S. Application Data

(60) Provisional application No. 62/840,538, filed on Apr. 30, 2019.

(51) Int. Cl.
*G06T 7/11*      (2017.01)
*G06T 7/00*      (2017.01)
*G06V 10/82*     (2022.01)

(52) U.S. Cl.
CPC .............. *G06T 7/0012* (2013.01); *G06T 7/11* (2017.01); *G06V 10/82* (2022.01); *G06T 2207/10056* (2013.01); *G06T 2207/30004* (2013.01)

(58) Field of Classification Search
CPC ...................................... G06T 7/00
See application file for complete search history.

(56) References Cited

U.S. PATENT DOCUMENTS 10,013,781 B1 *  7/2018  Gammage ............... G06N 5/047
2009/0069477 A1 *  3/2009  Vogt ........................ C08L 23/02
                                                         524/378

(Continued)

FOREIGN PATENT DOCUMENTS

CN          109145927 A  *  1/2019  ............. G06F 18/24

OTHER PUBLICATIONS

A. Paszke, S. Gross, S. Chintala, and G. Chanan, PyTorch: An Imperative Style, High-Performance Deep Learning Library, ed, 12 pages, 2017.

(Continued)

*Primary Examiner* — Di Xiao
(74) *Attorney, Agent, or Firm* — Loginov & Associates, PLLC; William A. Loginov (57) ABSTRACT

This invention provides a system and method for analyzing and classifying imaged from whole slides of tissue. A source of image data transmits images of the tissue on the whole slides to a GPU. The GPU performs a feature extraction process that identifies and segments regions of interests in each of the images, and an attention network that, based upon training from an expert, identifies trained characteristics can comprise cancerous and/or pre-cancerous conditions/e.g. those associated with a gastrointestinal tract, such ad Barret's Esophagus. The feature extraction process can (Continued)

include a convolutional neural network (CNN). The attention network can be adapted performs attention/based weighting of features relative to the trained characteristics, and/or the attention network can include 3D convolutional filters. The image data is acquired using an image sensor having approximately 100 Megapixel resolution.

17 Claims, 5 Drawing Sheets

(56) References Cited

U.S. PATENT DOCUMENTS

| | | | |
|---|---|---|---|
| 2015/0347833 A1* | 12/2015 | Robinson | G01B 11/25 348/49 |
| 2017/0200066 A1* | 7/2017 | Wang | G06N 3/045 |
| 2018/0165934 A1 | 6/2018 | Pan | |
| 2018/0204048 A1 | 7/2018 | Chefd'Hotel | |
| 2019/0114770 A1 | 4/2019 | Song | |
| 2019/0213779 A1* | 7/2019 | Sutton | G06T 7/11 |
| 2019/0355113 A1* | 11/2019 | Wirch | G06F 18/2148 |
| 2020/0160510 A1* | 5/2020 | Lindemer | G06F 40/216 |
| 2021/0056722 A1* | 2/2021 | Wu | G06N 3/084 |
| 2021/0059762 A1* | 3/2021 | Ng | G06T 7/344 |

OTHER PUBLICATIONS

B. Korbar et al., Looking Under the Hood: Deep Neural Network Visualization to Interpret Whole-Slide Image Analysis Outcomes for Colorectal Polyps, in Computer Vision and Pattern Recognition Workshops (CVPRW), 2017 IEEE Conference on, 2017, pp. 821-827: IEEE.

Cosatto et al., Automated gastric cancer diagnosis on h&e-stained sections; training a classifier on a large scale with multiple instance machine learning, in Medical Imaging 2013: Digital Pathology, 2013, vol. 8676, p. 867605: International Society for Optics and Photonics.

D. Komura, S. J. C. Ishikawa, and S. B. Journal, Machine learning methods for histopathological image analysis, vol. 16, pp. 34-42, 2018.

E. Pesce, P.P. Ypsilantis, S. Withey, R. Bakewell, V. Goh, and G. J. a. p. a. Montana, Learning to detect chest radiographs containing lung nodules using visual attention networks, 13 pages, 2017.

F. Wang et al., Residual attention network for image classification, IEEE, 9 pages, 2017.

G. Corredor, J. Whitney, V. L. A. Pedroza, A. Madabhushi, and E. R. J. J. o. M. I. Castro, Training a cell-level classifier for detecting basal-cell carcinoma by combining human visual attention maps with low-level handcrafted features, vol. 4, No. 2, p. 021105, 2017.

J. Fu, H. Zheng, and T. Mei, Look closer to see better: Recurrent attention convolutional neural network for fine-grained image recognition, in CVPR, 2017, vol. 2, p. 3.

K. He, X. Zhang, S. Ren, and J. Sun, Delving deep into rectifiers: Surpassing human-level performance on imagenet classification, in Proceedings of the IEEE international conference on computer vision, 2015, pp. 1026-1034.

K. He, X. Zhang, S. Ren, and J. Sun, Identity mappings in deep residual networks, in European conference on computer vision, 2016, pp. 630-645: Springer.

L. C. Chen, Y. Yang, J. Wang, W. Xu, and A. L. Yuille, Attention to scale: Scale-aware semantic image segmentation, in Proceedings of the IEEE conference on computer vision and pattern recognition, 2016, pp. 3640-3649.

L. Hou, D. Samaras, T. M. Kurc, Y. Gao, J. E. Davis, and J. H. Saltz, Patch-based convolutional neural network for whole slide tissue image classification, in Proceedings of the IEEE Conference on Computer Vision and Pattern Recognition, 2016, pp. 2424-2433.

M. Jaderberg, K. Simonyan, and A. Zisserman, Spatial transformer networks, in Advances in neural information processing systems, Google DeepMind, 2015, pp. 2017-2025.

M. Saha, C. Chakraborty, D. J. C. M. I. Racoceanu, and Graphics, Efficient deep learning model for mitosis detection using breast histopathology images, vol. 64, pp. 29-40, 2018.

N. Coudray et al., Classification and mutation prediction from non-small cell lung cancer histopathology images using deep learning, vol. 24, No. 10, p. 1559, 2018.

N. Srivastava, G. Hinton, A. Krizhevsky, I. Sutskever, and R. J. T. J. o. M. L. R. Salakhutdinov, Dropout: a simple way to prevent neural networks from overfitting, vol. 15, No. 1, pp. 1929-1958, 2014.

N. Tomita, et al., Finding a Needle in the Haystack: Attention-Based Classification of High Resolution Microscopy Images, 2018, 9 pages.

P.P. Ypsilantis and G. J. a. p. a. Montana, Learning what to look in chest X-rays with a recurrent visual attention model, 5 pages, 2017.

Q. Guan, Y. Huang, Z. Zhong, Z. Zheng, L. Zheng, and Y. J. a. p. a. Yang, Diagnose like a radiologist: Attention guided convolutional neural network for thorax disease classification, 10 pages, 2018.

X. Glorot and Y. Bengio, Understanding the difficulty of training deep feedforward neural networks, in Proceedings of the thirteenth international conference on artificial intelligence and statistics, 2010, pp. 249-256.

Y. A. Chung and W. H. J. a. p. a. Weng, Learning Deep Representations of Medical Images using Siamese CNNs with Application to Content-Based Image Retrieval, 8 pages, 2017.

* cited by examiner

SYSTEM AND METHOD FOR ATTENTION-BASED CLASSIFICATION OF HIGH-RESOLUTION MICROSCOPY IMAGES

STATEMENT REGARDING FEDERALLY SPONSORED RESEARCH OR DEVELOPMENT

This invention was made with government support under Grant #P20GM104416 awarded by the National Institutes of Health. The government has certain rights in the invention.

FIELD OF THE INVENTION

This invention relates to classification of high-resolution microscopy images used in pathology, and more particularly to computerized techniques for analyzing whole-slide microscopy images.

BACKGROUND OF THE INVENTION

In the field of pathology, tissue slides are scanned as high-resolution images, which can have sizes up to 10,000× 10,000 pixels (approximately 100 Megapixels). This high-resolution is desired because each whole slide contains thousands of cells, for which the cellular structures must be visible in order to identify regions of the tissue that indicate disease (lesions). However, the size of lesions is often relatively small, typically occupying around 100×100 pixels in the overall image, and most of the cells in a given slide are normal. Therefore, the decisive regions of interest containing lesions usually comprise much less than one percent of the imaged tissue area. Even for trained pathologists, localizing these lesions for the classification of the whole slide is time-consuming and often inconsistent in results. In recent years, computer-based deep learning has made considerable advances in classification of microscopy images. A common approach in this domain involves a sliding window for crop classification, followed by statistical methods of aggregation for whole-slide inference. See by way of useful background information, Cosatto et al., *Automated gastric cancer diagnosis on h&e-stained sections; training a classifier on a large scale with multiple instance machine learning*, in Medical Imaging 2013: Digital Pathology, 2013, vol. 8676, p. 867605: International Society for Optics and Photonics; L. Hou, D. Samaras, T. M. Kurc, Y. Gao, J. E. Davis, and J. H. Saltz, *Patch-based convolutional neural network for whole slide tissue image classification*, in Proceedings of the IEEE Conference on Computer Vision and Pattern Recognition, 2016, pp. 2424-2433; D. Komura, S. J. C. Ishikawa, and S. B. Journal, *Machine learning methods for histopathological image analysis*, vol. 16, pp. 34-42, 2018; B. Korbar et al., *Looking Under the Hood: Deep Neural Network Visualization to Interpret Whole-Slide Image Analysis Outcomes for Colorectal Polyps*, in Computer Vision and Pattern Recognition Workshops (CVPRW), 2017 IEEE Conference on, 2017, pp. 821-827: IEEE; and M. Saha, C. Chakraborty, D. J. C. M. I. Racoceanu, and Graphics, *Efficient deep learning model for mitosis detection using breast histopathology images*, vol. 64, pp. 29-40, 2018.

In this approach, pathologists viewing images of the slides on computer display annotate bounding boxes on whole slides in order to train a classifier on small crops, typically of sizes in the range of 200×200 pixels to 500×500 pixels. For evaluating a whole slide, this crop classifier is applied to extracted windows from the image, and then a heuristic, often developed in conjunction with a domain-expert (human) pathologist, is used to determine how the distribution of crop classification scores translates into a whole-slide diagnosis.

However, there are many limitations to this sliding window approach. For example, since crop classifiers are needed, all images in the training set must be annotated by pathologists with bounding boxes around each region of interest. In addition, developing a heuristic for aggregating crop classifications often requires pathologist expertise and/or insight. Thus, the present approach is practical when engineers have easy access to medical professionals, but it is not scalable, as the heuristics used are dependent on the nature of the classification task and therefore unique. Also, in the sliding window approach, crops are classified independently of their neighbors and whole-slide classification does not consider the correlations between neighboring windows. More generally, the use of automation to examine slides is highly desirable to alleviate the possibility of human errors, speed diagnosis, allow for remote diagnostic and treatment of distantly located patients, and generally reduce the need for time-intensive examination by expert practitioners.

SUMMARY OF THE INVENTION

This invention overcomes the disadvantages of the prior art by providing a system, method and non-transitory computer-readable medium of program program instructions for whole-side examination that uses an attention-based mechanism to classify microscopy images. In an illustrative embodiment, the system and method for analyzing and classifying imaged from whole slides of tissue provides a source of image data that transmits images of the tissue on the whole slides to a GPU. The GPU performs a feature extraction process that identifies and segments regions of interest in each of the images, and an attention network that, based upon training from an expert, identifies trained characteristics in the regions of interest and provides identification data to a user, which can be accessible through an interface. Illustratively, the characteristics can comprise medical conditions, such as cancerous and/or pre-cancerous conditions in the tissue. One such group of cancerous/pre-cancerous conditions associated with a gastrointestinal tract of the patient (e.g. Barret's Esophagus). Illustratively, the feature extraction process can include a convolutional neural network (CNN). The attention network can be adapted performs attention-based weighting of features relative to the trained characteristics, and/or the attention network can include 3D convolutional filters of size N×d×d, where N is a depth of a filter kernel and d denotes a height and width of the kernel. Illustratively, the image data of each whole slide is acquired using an image sensor having approximately 100 Megapixel resolution (the term "100 Megapixel(s)" being taken broadly to include approximately 10000×10000 pixels and/or a similar granularity/resolution in another aspect ratio, that may provide a larger, or (typically) smaller, actual pixel count).

BRIEF DESCRIPTION OF THE DRAWINGS

The invention description below refers to the accompanying drawings, of which.

DETAILED DESCRIPTION

I. System Overview

Figure 1:
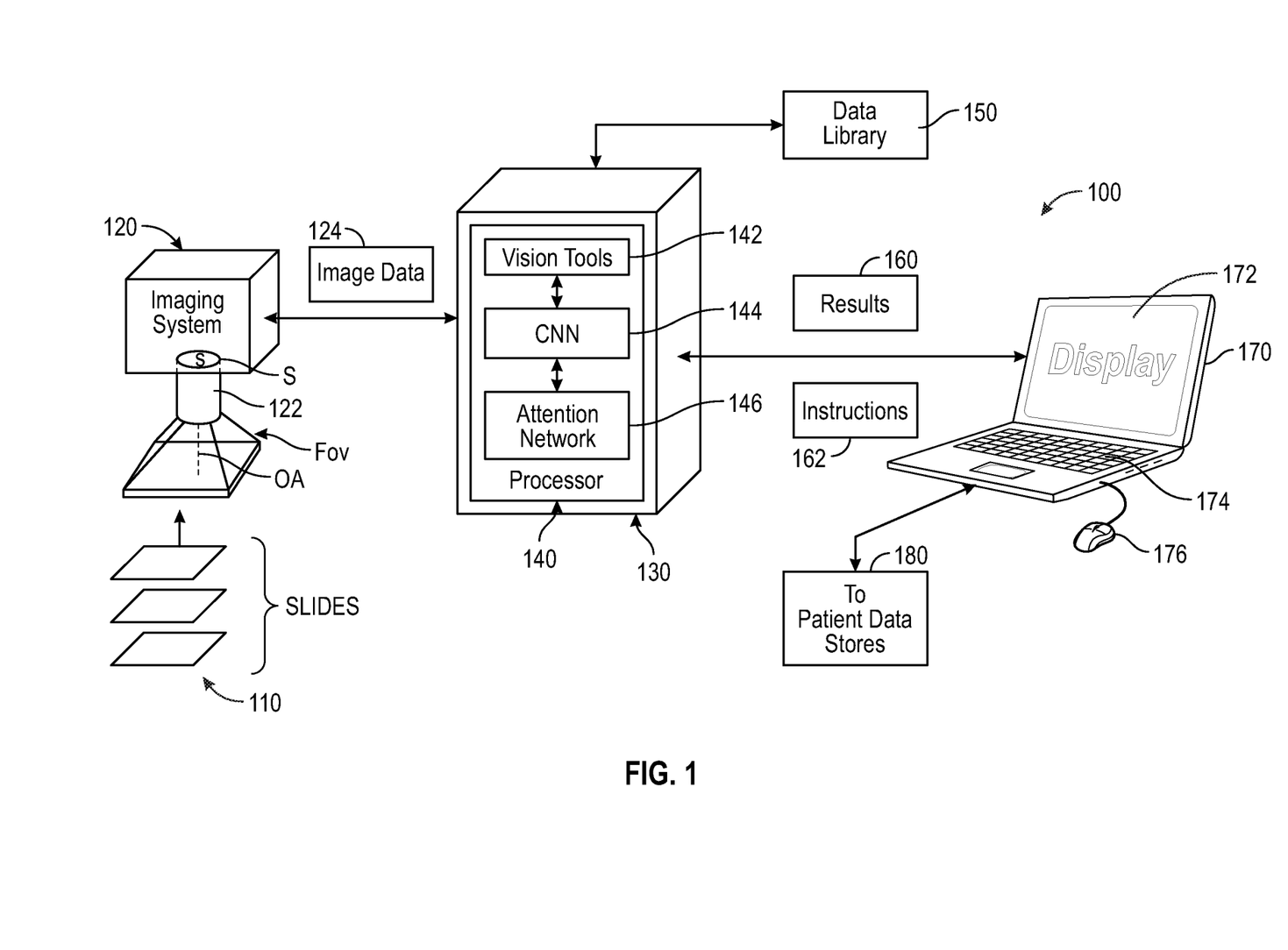
FIG. 1 is a diagram of an overview of a system for analyzing and classifying features on whole-slide images according to an illustrative embodiment.

FIG. 1 shows and arrangement 100 for scanning whole slides 110, which are generated using patient tissue—for example in connection with potentially diseased/tumorous tissue, such as found in the esophagus. A selected slide 112 from the group of slides 110 to be examined is imaged using a camera-based imaging system (e.g. having CMOS image sensor S) 120 in conjunction with microscope optics 122. The optics 122 is aligned along an optical axis OA, and images a field of view (FOV) that encompasses the slide 112. Appropriate illumination (not-shown—for example, backlit illumination) can be provided, and more generally, the imaging system and associated optics can be of conventional design, with the sensor S having at least a 10,000× 10,000 resolution in exemplary implementations.

The image data 124, generated by the imaging system 120 and associated sensor S, is transmitted to a computing device 130. Transmission can be via a network or physical loading of stored data—for example via a portable (e.g. USB-based) drive. The computing device can be any standalone or network based data processing system with an associated processor arrangement 140. The computing computing device 130 can, thus, be a server, PC, laptop, cloud-computing arrangement, or combination of such, and/or a purpose-built processing device, such as one or more FPGAs. More particularly, the computing device processor can include a graphics processing unit GPU (with one or more parallel graphics processor(s), which is adapted to handle image data at high volume and speed. The architecture and/or programming of such processor(s) is known to those of skill. The processor/GPU 140 and its associated process module(s) includes vision system tools 142 that perform basic machine vision and image manipulation tasks on the received image data 124. These can include edge detection and alignment, blob analysis and bounding box generation (e.g. around the slide perimeter to narrow the region of interest to be analyzed by subsequent processes. These subsequent processes (described in further detail below) include segmenting the image data using a convolutional neural network (CNN) 144 and feature-based weighting using an attention network 146 in accordance with the exemplary embodiment herein. A data library 150 that can be locally stored or part of a remote network can be used to train and refine the CNN and/or attention network in a manner described below.

The results 160 of the analysis performed by the attention network 146 are provided to a local user interface/computing device (for example, a PC, server, laptop, tablet or smartphone) 170, with associated graphical user interface (GUI) display/touchscreen 172, keyboard 174, mouse 176, etc. for observing and manipulating images and/or textual content. The user interface/computing device 170 can provide instructions and associated control data 162 to the system computing device 130 and associated processor/GPU 140 for use in processing/analyzing image data. Results and associated annotations provided by a practitioner can be transmitted via a network and/or portable storage to a patient data store 180 using appropriate mechanisms (e.g. encrypted data formatting). These results can be appended to the patient's chart/file and used in subsequent consultation and treatment.

II. Image Analysis

A. CNN and Attention-Based Network Operation Overview

By way of further background information, attention models are applied to regular image analysis tasks, especially image captioning. Such attention mechanisms are described as a part of the prediction module that sequentially selects subsets of input to be processed. See by way of useful background information, L. C. Chen, Y. Yang, J. Wang, W. Xu, and A. L. Yuille, *Attention to scale: Scale-aware semantic image segmentation*, in Proceedings of the IEEE conference on computer vision and pattern recognition, 2016, pp. 3640-3649; and Y. A. Chung and W. H. J. a. p. a. Weng, *Learning Deep Representations of Medical Images using Siamese CNNs with Application to Content-Based Image Retrieval*, 2017.

Figure 2:
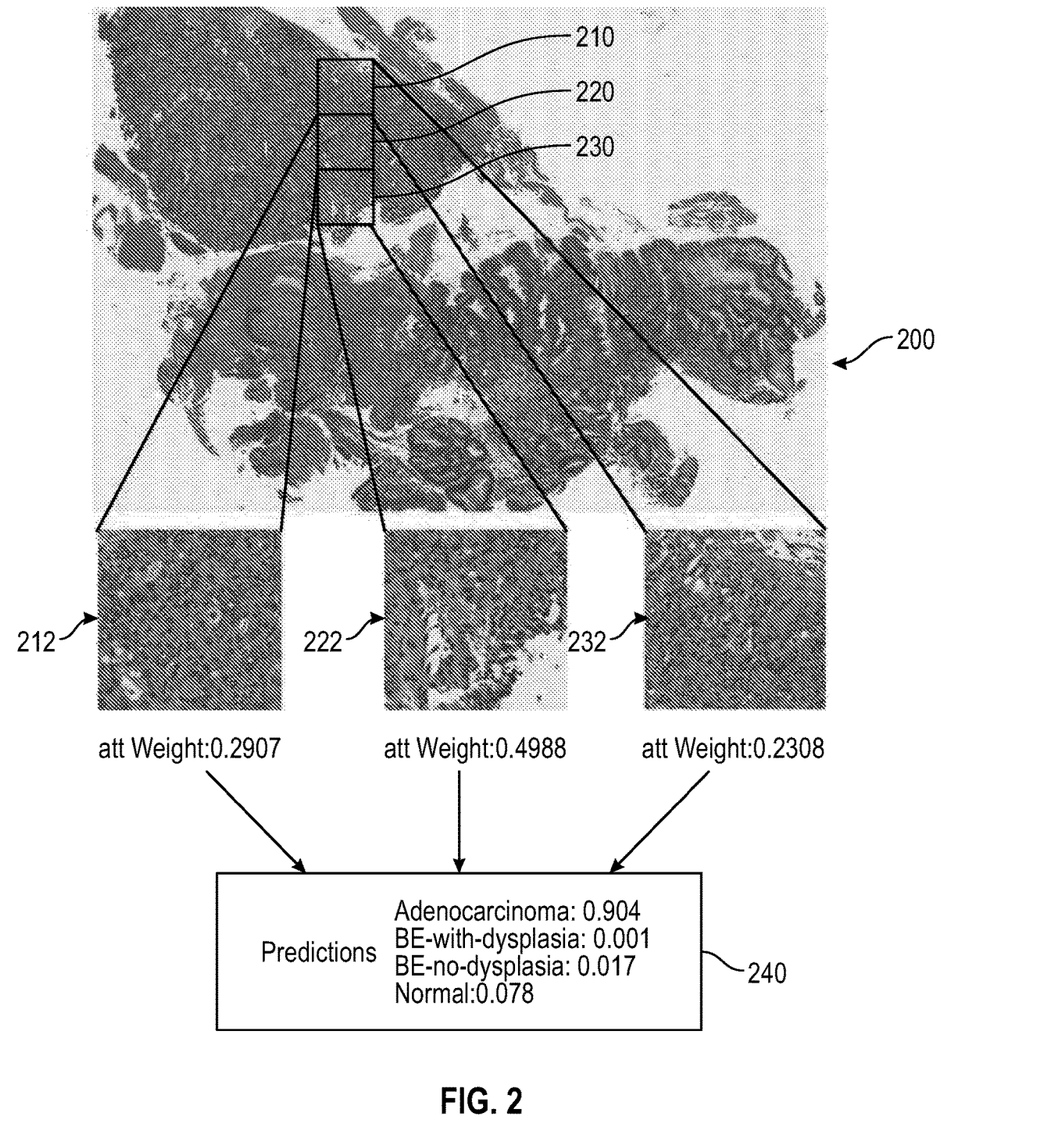
FIG. 2 is a diagram of an exemplary whole-slide image showing the dynamic location of regions of interest for further inspection in accordance with the system and method of FIG. 1.

Reference is made to FIG. 2, which shows an exemplary microscopy slide image 200 containing regions of interest with diseased tissue (e.g. adenocarcinoma, Barret's Esophagus (BE) with-dysplasia and BE-without-dysplasia) described further below, and which is subjected to the attention-based classification model employed by the processor 140 in the module 146. The attention-based model dynamically finds regions of interest for closer inspection. The image 200 is segmented into a grid tiles 210, 220 and 230 (shown in the image and as respective magnified squares 212, 222 and 232 based upon (e.g.) the CNN 144. Predictions are made based on weighted features from each tile, as shown in the results box 240. The size of this exemplary microscopy image is 4,428×6,396 pixels.

The exemplary attention-based model herein dynamically identifies regions of interest in a high-resolution image and makes a whole-slide classification based on analyzing only these selected regions. This methodology is essentially analogous to how pathologists examine slides under the microscope. The model is trainable end-to-end with only whole-slide labels. All components of the model are optimized through backpropagation. Unlike the current sliding window approach, the exemplary attention-based model does not entail use of bounding box annotations for regions of interest or pathologist insight for heuristic development. The model is also flexible with regard to input size for images. Using methodology that is based upon convolutional network techniques, the illustrative grid-based attention module uses a 3D convolution operation that does not require a fixed size input grid. The input size can be any rectangular shape that fits in GPU memory.

Figure 3:
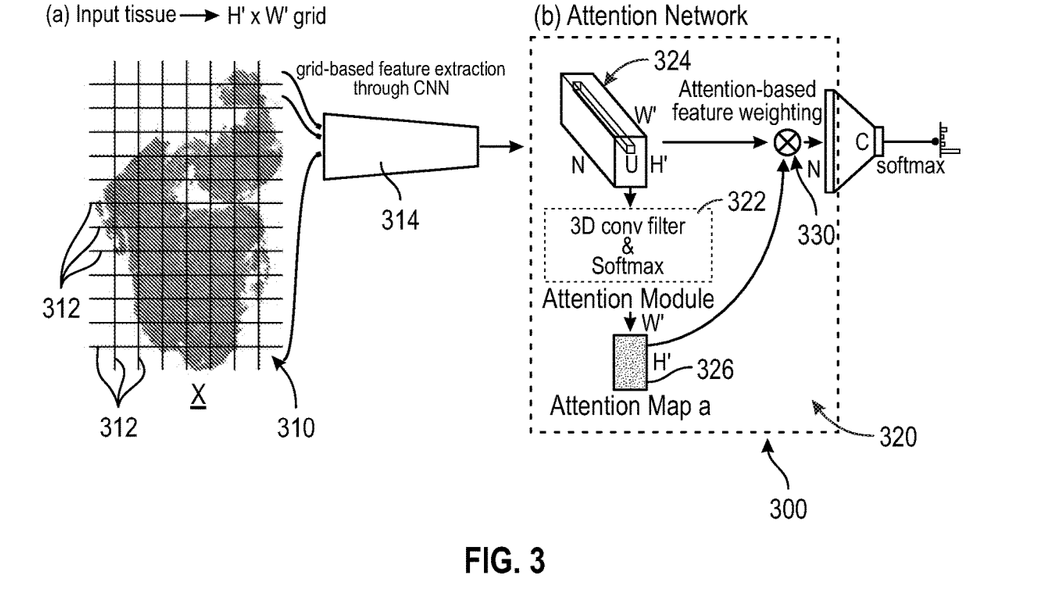
FIG. 3 is a diagram showing an overview of the attention-based network for use in the system and method of FIG. 1 including feature extraction and attention-based feature weighting.
Figure 4:
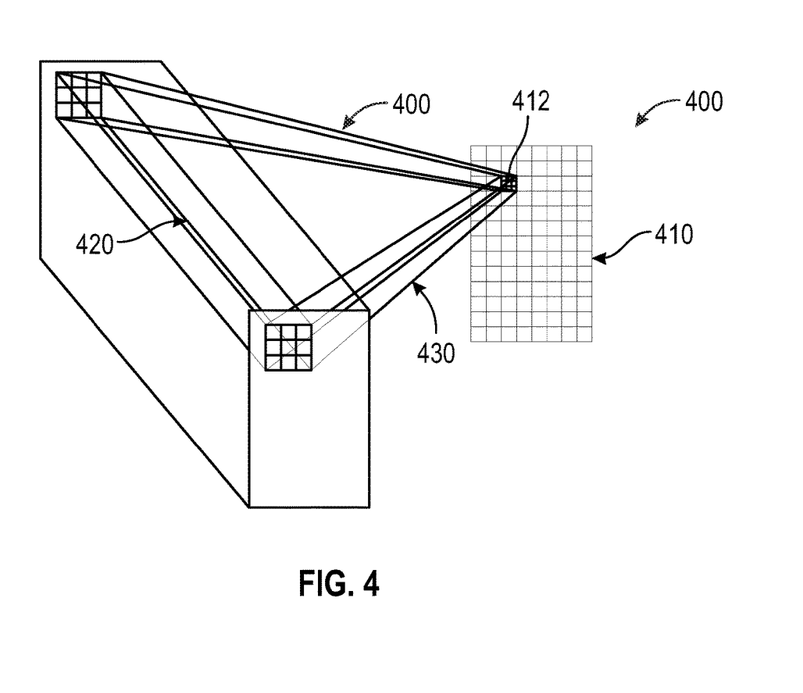
FIG. 4 is a diagram showing the use of a grid-based attention mechanism that employs 3D convolution for the attention network of FIG. 3.

More particularly, with reference to the operational procedure 300 of FIG. 3, the model herein uniquely generalizes the attention mechanism to classification of a high-resolution slide image 310. As shown, the input image x (310) is divided into H'×W' (height×width) grid cells (the depicted dividing lines 312 are shown only for visualization) to extract features using the CNN 314. These cells are provided to the attention network 320. Learnable 3D convolutional filters of size N×d×d 322 are then applied on the grid-based feature map tensor U 324 to generate an attention map α (326), which operates as the weights for an affine combination of U in an attention-based feature weighting operation 330. As shown further in the depiction 400 of FIG. 4, the grid-based attention mechanism uses a 3D convolution. The significance of each location 412 in the grid 410 is determined based on its own features and those of its surrounding crops (cuboidal box 420). In the exemplary depiction 400, the application of a 3D convolutional filter of size 512×3×3 is depicted by the lead lines 430.

Although the definition of attention mechanisms in the art is not applicable to non-sequential tasks, the essence of attention mechanisms can be reduced to the ability of networks to generate a dynamic representation of features through weighting them in response to the geometric and holistic context of input. Recent advancement of soft attention enabled end-to-end training on convolutional neural network (CNN) models. See by way of useful background information, J. Fu, H. Zheng, and T. Mei, *Look closer to see better: Recurrent attention convolutional neural network for fine-grained image recognition*, in CVPR, 2017, vol. 2, p. 3; M. Jaderberg, K. Simonyan, and A. Zisserman, *Spatial transformer networks*, in Advances in neural information processing systems, 2015, pp. 2017-2025; and F. Wang et al., *Residual attention network for image classification*, 2017. Spatial transformer networks capture high-level information from inputs to derive affine transformation parameters, which are subsequently applied to spatial invariant input for a CNN. For semantic segmentation tasks, the attention mechanism is applied to learn multi-scale features. Residual attention networks use soft attention masks to extract features in different granularities. To analyze images in detail, a top-down recurrent attention CNN has been proposed. Notably, the exemplary implementation herein is based on the soft attention mechanism, but designed for classification of high-resolution images that are not typically encountered in the field of computer/machine vision.

B. Attention in Medical Image Analysis.

There have been several applications of the attention mechanism in the medical domain, such as using soft attention to generate masks around lesion areas on CT images (See by way of useful background information, Q. Guan, Y. Huang, Z. Zhong, Z. Zheng, L. Zheng, and Y. J. a. p. a. Yang, *Diagnose like a radiologist: Attention guided convolutional neural network for thorax disease classification*, 2018,), and employing recurrent attention models fused with reinforcement learning to to locate lung nodules (See by way of useful background information, E. Pesce, P. P. Ypsilantis, S. Withey, R. Bakewell, V. Goh, and G. J. a. p. a. Montana, *Learning to detect chest radiographs containing lung nodules using visual attention networks*, 2017.), or enlarged hearts (See by way of useful background information, P. P. Ypsilantis and G. J. a. p. a. Montana, *Learning what to look in chest X-rays with a recurrent visual attention model*, 2017) in chest radiography images. In pathology, recorded navigation of pathologists has been used as attention maps to detect carcinoma (See by way of useful background information G. Corredor, J. Whitney, V. L. A. Pedroza, A. Madabhushi, and E. R. J. J. o. M. I. Castro, *Training a cell-level classifier for detecting basal-cell carcinoma by combining human visual attention maps with low-level handcrafted features*, vol. 4, no. 2, p. 021105, 2017.). The soft attention approach in deploys two parallel networks for the classification of thorax disease. The exemplary implementation is based upon this approach, but directly reuses extracted features in a single attention network.

C. Operational Model

As described generally above, the illustrative procedure has two phases. The first phase is grid-based feature extraction from the whole image, where each grid cell in the whole-slide is analyzed to generate a feature map. The second phase applies the attention network on the extracted features for whole-slide classification. Notably, the feature extractor is jointly optimized across all the tiles along with the attention module in an end-to-end fashion.

D. Grid-Based Feature Extraction

To extract features on the whole image through a CNN, every slide image is divided image is divided into smaller tiles with no (free-of) overlap. Features are extracted from each tile and reformatted to a single grid-based set of features. The feature map is generated in the following fashion (as also depicted and described above): let x denote an input image of shape 3×H×W, where 3, H and W are the red, green and blue pixel (RGB) color channels, height, and width of the image, respectively. Through feature extraction, a feature map tensor U of shape N×H'×W', where N is the number of extracted features, H' is the number of rows, and W' is the number of columns of non-overlapping tiles on the image. More particularly, H':=[H/h] and W':=[W/w], where h and w are the height and width of each tile.

With reference to CNN architecture, the commercially available, residual neural network (ResNet) architecture is employed (See by way of useful background information, K. He, X. Zhang, S. Ren, and J. Sun, *Deep residual learning for image recognition*, in Proceedings of the IEEE conference on computer vision and pattern recognition, 2016, pp. 770-778.). This architecture is one of the state-of-the-art CNN models with high performance on the ImageNet Large Scale Visual Recognition Competition (ILSVRC), as well as many medical image classification tasks. Among several variants of ResNet models, the exemplary implementation can employ the pre-activation ResNet-18 model (See by way of useful background information, K. He, X. Zhang, S. Ren, and J. Sun, *Identity mappings in deep residual networks*, in European conference on computer vision, 2016, pp. 630-645: Springer.). This model achieves a good trade-off between performance and GPU memory usage, which is vital for processing high-resolution image data. By removing the final fully-connected layer before the global pooling layer, the network produces a tensor of size of 512×H'×W' as output for an input image. The model is extended herein by replacing all 2D convolutions with 3D convolutional filters of shape 1×3×3 in order to implement mini-batch training for image samples. Consequently, input tensors are defined as T×(H'·W')×3×h×w, where T is the mini-batch size.

E. Attention-Based Classification

After feature extraction, attention modules are applied to the feature map, with their weights determining the importance of each tile. Then, a feature vector is computed and optimized against labels of each image in a feedforward neural network, allowing for classification of the entire whole-slide image. For the attention mechanism of the exemplary implementation, the procedure applies 3D convolutional filters of size N×d×d, where N is the kernel's depth and d denotes the height and width of the kernels. As a general example of the operation of the procedure herein, one filter and one corresponding attention map is described. Applying a 3D filter of size N×d×d to a feature map U thereby generates a raw attention map output of $V \in \mathbb{R}^{H' \times W'}$. Once V is computed, an attention map is calculated by:

$$\sigma(V)_{i,j} = \frac{e^{V_{i,j}}}{\sum_{h=1}^{H'} \sum_{w=1}^{W'} e^{V_{h,w}}}$$

where i and j are row and column indices of the resulting attention map α. By treating the attention map α as feature weights, the components $z_n$ of the final feature vector z are computed by:

$$z_n = \sum_{h=1}^{H'} \sum_{w=1}^{W'} \sigma(V)_{h,w} \cdot U_{n,h,w}$$

The feature vector z is subsequently used for whole-slide classification through fully connected layers and a non-linear activation function. Moreover, the use of multiple attention modules in the exemplary framework can potentially capture more local patterns for classification, increasing the capacity and robustness of the network, particularly for medical images of high-resolution. As such, the procedure simultaneously applies m 3D filters that generate m attention maps and individually populate m, respective, feature vectors. All feature vectors are then concatenated to form a single vector, which is fed to the fully connected classifier. In the end-to-end training pipeline, the cross-entropy loss over all classes is computed on classification predictions. The loss is back-propagated to optimize all parameters in the network without any specific adjustment for attention modules. Our model does not need bounding box annotations around regions of interest, and all optimization is performed with respect to only the labels at the whole-slide level.

III. Experimental Results

Having described the implementation and operation of the system and method herein, the following is a discussion of experimental procedures and results employing the illustrative attention-based classification model herein for high-resolution microscopy images related to a dataset of Barrett's Esophagus (BE) images, which are slides of tissues surgically removed from patients at risk of esophageal cancer. The results of the illustrative model's performance are compared to those generated by the state-of-the-art sliding window method. In general, the results determined that the illustrative model outperforms this sliding window model by a significant margin.

A. Experimental Dataset

For the experiment, whole-slide images were collected from patients who underwent endoscopic gastric mucosal biopsy since 2017. Commercially available (e.g. Leica Aperio) digital scanners digitized H&E-stained whole-slide images at 20× magnification. A total of 180 whole-slide images were generated, and 116 were used as the development set, while 64 were used as the test set. 20% of the development set were reserved for validation. In order to determine labels for whole-slide images and to train the sliding window method as our baseline, bounding boxes around lesions in these images were annotated by two human pathologists of ordinary, or greater than ordinary, skill in the art. These labels as reference standard, as any disagreements in annotation were resolved through further discussion among annotators and consultation with a senior domain-expert pathologist. These bounding boxes were not used in training the illustrative attention-based model.

Figure 5A:
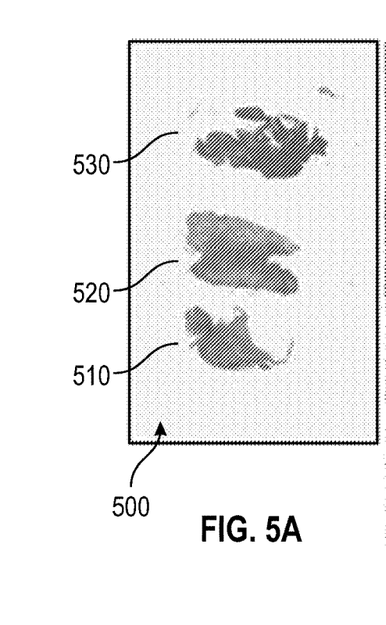
FIG. 5A is a diagram showing a typical whole-slide image input to the system and method of FIG. 1 as part of a runtime dataset.
Figure 5B:
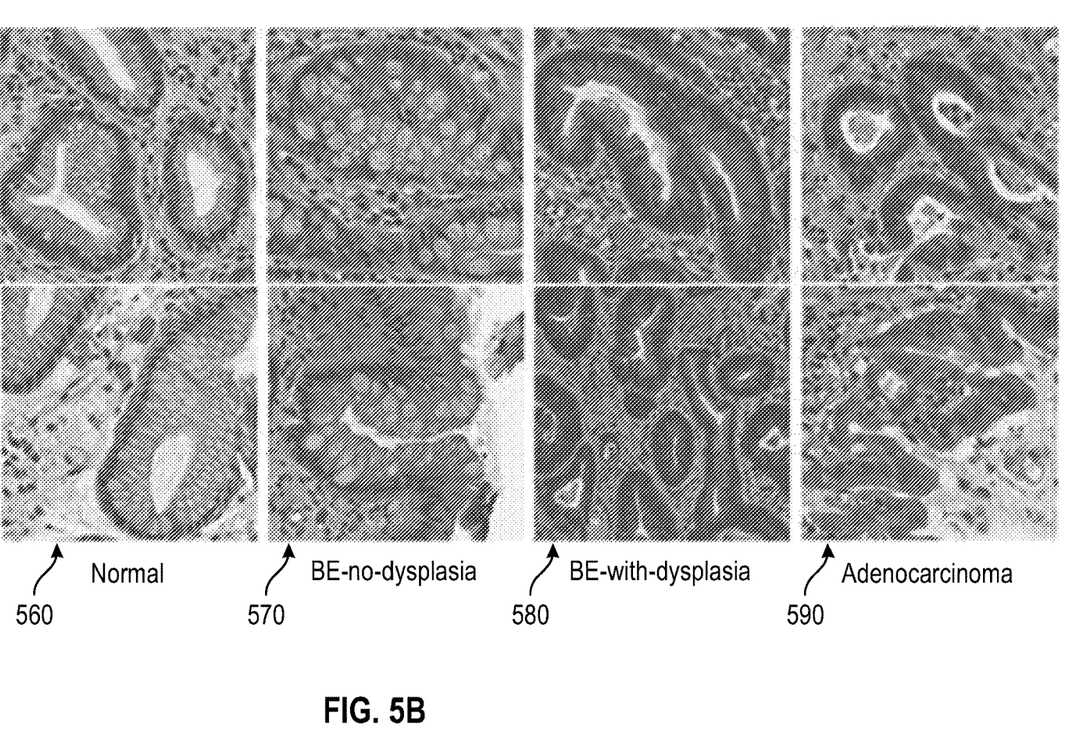
FIG. 5B is a diagram showing examples of classified medical conditions or characteristics in segmented regions of interest in the image of FIG. 5A.

For preprocessing, white background is removed from the slides and only regions of the images that contain tissue is extracted. FIG. 5A shows a typical whole-slide image 500 from the dataset. These images can cover multiple pieces of to tissue, so they are separated into large sub-images 510, 520 and 530 with average size of (e.g.) 5,131×5,875 pixels, each only covering a single piece of tissue. Every sub-image has an overall label based on the labels of its lesions. If multiple lesions with different classes are present, then the class with the highest risk is used as the corresponding label, as that lesion would have the highest impact clinically. If no abnormal lesions are found in a sub-image, then it is assigned to the normal class. After this preprocessing step, and as depicted in FIG. 5B, each sub-image is assigned to one of our four classes: Normal (560), BE-no-dysplasia (570), BE-with-dysplasia (580), and Adenocarcinoma (590). The dataset includes (e.g.) 256 sub-images after preprocessing. To avoid possible data leakage, extracted tissues from one whole-slide image are all placed into the same set of images when the development and test set are split. Table 1 below summarizes the test dataset.

TABLE 1

Class distribution of Barrett's Esophagus (BE) images in test dataset.

| Diagnosis | Number (%) |
|---|---|
| Normal | 58 (47.2%) |
| BE-no-dysplasia | 30 (24.4%) |
| BE-with-dysplasia | 14 (11.4%) |
| Adenocarcinoma | 21 (17.1%) |

B. Sliding Window Baseline

In order to compare the exemplary model to previous methods for high-resolution image analysis, a current, state-of-the-art sliding window method can be implemented, as described in N. Coudray et al., *Classification and mutation prediction from non-small cell lung cancer histopathology images using deep learning*, vol. 24, no. 10, p. 1559, 2018 and B. Korbar et al., *Looking Under the Hood: Deep Neural Network Visualization to Interpret Whole-Slide Image Analysis Outcomes for Colorectal Polyps*, in Computer Vision and Pattern Recognition Workshops (CVPRW), 2017 IEEE Conference on, 2017, pp. 821-827: IEEE (by way of useful background information). In this method, annotated bounding box labels are used to generate small crops of size 224×224 pixels for training a crop classifier. For For preprocessing, color channels (RBG) are normalized, and a standard data augmentation including color jittering, random flips, and rotations is performed.

For training of the network, the ResNet-18 is initialized with the He initialization (See by way of useful background information, K. He, X. Zhang, S. Ren, and J. Sun, *Delving deep into rectifiers: Surpassing human-level performance on imagenet classification*, in Proceedings of the IEEE international conference on computer vision, 2015, pp. 1026-1034.). By way of example, the procedure optimizes over the cross-entropy loss function for 100 epochs, employing standard weight regularization techniques and learning rate decay. The crop classifier is trained to predict the class of any given window in a whole-slide image. For whole-slide inference, a grid search is performed over the validation set to find optimal thresholds for filtering noise. Then, two separate human pathologists were consulted to develop heuristics for aggregating crop predictions. The thresholds and heuristic are chosen from the approach that performed the best on the validation set and applied that to the whole-slide images in the test set. Performance metrics for this sliding window approach are shown in Table 2 below.

TABLE 2

Classification results for our test set on Barrett's Esophagus. The model's performance is assessed in terms of accuracy, recall, precision, and F1 score, and the illustrative model/system and method outperforms the sliding window baseline in and F1 score for all classes.

| Ground Truth | | Sliding Window | Attention Model |
|---|---|---|---|
| Normal | Accuracy | 0.63 | 0.70 |
| | Recall | 0.62 | 0.69 |
| | Precision | 0.60 | 0.68 |
| | F1 Score | 0.61 | 0.68 |
| BE-no-dysplasia | Accuracy | 0.78 | 0.82 |
| | Recall | 0.43 | 0.77 |
| | Precision | 0.87 | 0.68 |
| | F1 Score | 0.58 | 0.72 |
| BE-with-dysplasia | Accuracy | 0.68 | 0.83 |
| | Recall | 0.36 | 0.21 |
| | Precision | 0.16 | 0.50 |
| | F1 Score | 0.22 | 0.30 |
| Adenocarcinoma | Accuracy | 0.87 | 0.88 |
| | Recall | 0.52 | 0.71 |
| | Precision | 0.65 | 0.63 |
| | F1 Score | 0.58 | 0.67 |
| Mean | Accuracy | 0.74 | 0.81 |
| | Recall | 0.48 | 0.60 |
| | Precision | 0.57 | 0.62 |
| | F1 Score | 0.50 | 0.63 |

Note, for purposes of the experimental procedure described herein, the following exemplary definitions can be used with respect to the medical conditions represented by the image dataset.

(1) Normal: includes normal stratified squamous epithelium, normal squamous and columnar junction epithelium, and normal columnar epithelium.

(2) BE-no-dysplasia: includes Barrett's Esophagus negative for dysplasia or indefinite for dysplasia. Barrett's Esophagus is defined by columnar epithelium with goblet cells (intestinal metaplasia) and preservation of orderly glandular architecture of the columnar epithelium with surface maturation. Indefinite for dysplasia denotes that the lesion is suggestive of but not diagnostic of dysplasia, such as significant atypia with or without surface maturation in the context of inflammation, ulceration, or regenerative changes.

(3) BE-with-dysplasia: includes noninvasive low-grade neoplasia (low-grade dysplasia) and noninvasive high-grade neoplasia (high-grade dysplasia). Columnar epithelium with low-grade dysplasia is characterized by nuclear pseudostratification, mild to moderate nuclear hyperchromasia and irregularity, and the cytologic atypia extending to the surface epithelium. High-grade dysplasia demonstrates marked cytologic atypia including loss of polarity, severe nuclear enlargement and hyperchromasia, numerous mitotic figures, and architectural abnormalities such as lateral budding, branching, villous formation, as well as variation of the size and shape of crypts.

(4) Adenocarcinoma: includes invasive carcinoma (intramucosal carcinoma and submucosal carcinoma and beyond) and suspicious for invasive carcinoma. Cases of high-grade dysplasia with features suggestive of invasion are classified into this category; and the worrisome features include cribriform/solid growth, ulceration occurring within high-grade dysplasia, dilated dysplastic glands with necrotic debris, large angulated glands, and dysplastic tubules incorporated into overlying squamous epithelium.

C. Attention Model Implementation

The attention model was applied to the experimental dataset as described above. Given the size of features extracted from ResNet-18 model, 512×3×3 3D convolutional filters were used in the attention module, with the implicit zero-padding of (0, 1, 1) for depth, height, and width dimensions, respectively. By way of example, 64 of these filters were employed to increase the robustness of the attention module, as patterns in the feature space are likely too complex to be recognized and attended by a single filter. To avoid overfitting and encourage each filter to capture different patterns, the procedure regularized the attention module by applying dropout with $p=0.5$ after concatenating all the feature vectors z (See by way of useful background information, N. Srivastava, G. Hinton, A. Krizhevsky, I. Sutskever, and R. J. T. J. o. M. L. R. Salakhutdinov, *Dropout: a simple way to prevent neural networks from overfitting*, vol. 15, no. 1, pp. 1929-1958, 2014). We initialized the entire network with the He initialization for convolutional filters (see reference above), unit weight and zero-bias for batch normalizations, and the Glorot initialization for fully connected layers (See by way of useful background information, X. Glorot and Y. Bengio, *Understanding the difficulty of training deep feedforward neural networks*, in Proceedings of the thirteenth international conference on artificial intelligence and statistics, 2010, pp. 249-256.). Note that only the cross-entropy loss against class labels is used in training, and other information such as the location of bounding boxes is not given to the network as a guidance to optimal attention maps. The illustrative model desirably identifies such regions of interest automatically.

The feature extraction network is first initialized with weights pre-trained on the ImageNet dataset (See by way of useful background, Glorot, referenced above.). Input of the network is an extracted grid cell of (e.g.) 492×492 pixels and resized to (e.g.) 224×224 pixels. The input values are normalized by the mean and standard deviation of pixel values computed over all tissues. The last fully connected layer of the network is removed, and all residual blocks except for the last one are frozen, serving as a regularization mechanism. The entire network is trained on large tissue images extracted from whole slides. For data augmentation, a random rotation and random scaling is applied, with a scaling factor between 0.8 and 1.2 on the fly during training. By way of example, the procedure can employ an Adam optimizer with an initial learning rate of 1e-3, decaying by 0.95 after each epoch, and reset the learning rate to 1e-4 every 50 epochs in a total of 200 epochs, similar to the cyclical learning rate. The mini batch size is also set to (e.g.) two (2) to maximize the utilization of memory on the GPU, which in this example is a Titan Xp GPU, commercially available from NVidia of Santa Clara, CA In an exemplary arrangement the model is implemented in the associated PyTorch graphical operating system framework (See by way of useful background information, A. Paszke, S. Gross, S. Chintala, and G. Chanan, *PyTorch*, ed, 2017.).

D. Results

The illustrative model and associated system and method herein outperforms prior art techniques and methodology, based upon both a quantitative and a qualitative evaluation. As a reference baseline, results from using the sliding-window method are used for this classification task, trained on the same data split but with annotated bounding boxes. For quantitative evaluation, four standard metrics are used for classification: accuracy, recall, precision, and F1 score. The classification results on the test set are summarized on Table 2, above. Compared to the baseline, the illustrative model/system and method achieved better accuracy and F1 score in all classes. Particularly for F1 score, which is the harmonic mean of precision and recall, the illustrative model outperformed the baseline approach by at least 8% for each class. Quantitative analysis shows exemplary performance of the model on the Normal, BE-no-dysplasia, and Adenocarcinoma. Because BE-with-dysplasia was the least frequent class in the exemplary dataset, comprising only 11% of images, it is possible that the present arrangement performed less robustly on this class. Of note, our model is also the first to automate classification of tissue in Barrett's Esophagus using histopathology slides. The following is a further description of analysis processes employed.

Figure 6:
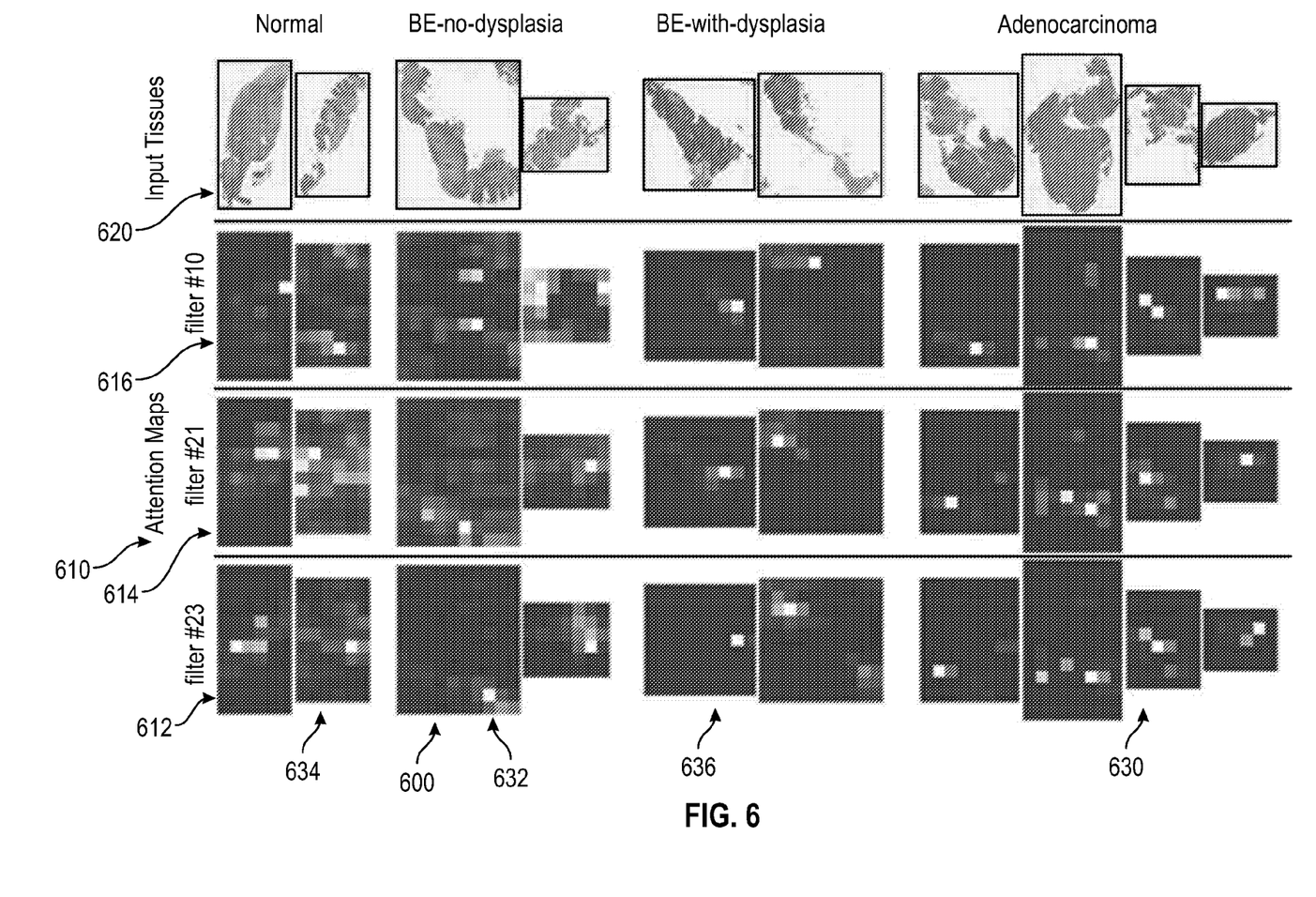
FIG. 6 is a diagram of whole-slide image regions of interest and associated attention maps with respect to different applied attention modules (filters), using the system and method of FIG. 1.

A qualitative analysis visualizes the generated 64 attention maps for all the testing images to verify the attention mechanism in the illustrative model. Characteristic examples for the Adenocarcinoma class are shown in FIG. 6. More particularly, FIG. 6 is a depiction 600 of various examples of attention maps 610 generated by different attention modules (filters) in rows 612, 614 and 616. The exemplary filters are optimized for attending to the features of the Adenocarcinoma class. The top row 620 shows input whole-slide sub-images from the test dataset. The second to fourth rows 612-616, thus, show attention maps of the selected attention modules for input images from different ground truth classes. As depicted, higher attention weight is denoted by white/light color and lower is denoted by black/dark color. For visualization purposes, each map is normalized so its maximum value is 1. The attended regions for the Adenocarcinoma class images (column 630) are verified to be correct by two human pathologists. In contrast, these attention modules are inattentive to lower risk class images. The distributions of the attention module highlighted across different classes indicate that each module looks for specific features in the Adenocarcinoma class. Furthermore, multiple attention modules complement each other to make a robust classification decision. For images without (free-of) the target features, the response is low over all regions (the first and second columns, representing normal and BE-no-dysplasia conditions, respectively) 632 and 634. For the third column 636 (BE-with-dysplasia), we observe that the attention map is focused on specific regions, which is reasonable from a clinical perspective, in which BE-with-dysplasia progresses to Adenocarcinoma as neoplastic epithelia begin to invade the muscularis mucosae.

IV. Conclusion

The above-described system and method for whole-slide analysis and classification provides a robust and reliable, automated technique for identifying and classifying diseased cells and other conditions on whole-slide images. Once appropriately trained, the system and method allows for automated segmenting of the regions of interest and characterization of underlying conditions in those regions. More particularly, the system and method provides an attention-based model for classification of high-resolution microscopy images. Analogous to how pathologists examine slides under the microscope, the system and method and associated model finds regions of interest and examines their features for whole-slide classification. The model generally outperforms the current sliding window method on a dataset for Barrett's Esophagus. Previous methodology for analyzing microscopy images is limited by manual annotation and access to medical expertise. Our model, on the other hand, is trained end-to-end with only labels at the whole-slide level, removing the high cost of data annotation and opening the door for deep learning to solve more classification problems in pathology.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A system for analyzing and classifying images from whole slides of tissue comprising:
   a source of image data including images of the tissue on the whole slides, each of the images divided into a plurality of adjacent non-overlapping tiles;
   a computer processor executing a CNN-based feature extraction process by which the processor identifies regions of interest in each non-overlapping tile of the images thereby producing a grid-based feature map of the identified regions of interest; and
   an attention network that, based upon training from an expert, when executed by the processor, configures the processor to identify trained characteristics in the regions of interest of the grid-based feature map and provide identification data for a least a portion of the identified regions of interest to a user,
   wherein the attention network-configured processor performs attention-based weighting of features relative to the trained characteristics, and wherein the attention network includes 3D convolutional filters of size N×d×d, where N is a depth of a filter kernel and d denotes a height and width of the kernel.

2. The system as set forth in claim 1 wherein the characteristics comprise medical conditions.

3. The system as set forth in claim 2 wherein the medical conditions comprise at least one of cancerous and pre-cancerous conditions.

4. The system as set forth in claim 3 wherein the tissue is associated with a gastrointestinal tract of the patient.

5. The system as set forth in claim 1 wherein the processor includes a GPU that operates the feature extraction process and executes the attention network.

6. The system as set forth in claim 1 wherein the image data of each whole slide is acquired using an image sensor having at least approximately 100 Megapixel resolution.

7. A method for analyzing and classifying images from whole slides of tissue comprising the steps of:
   acquiring image data including images of the tissue on the whole slides;
   dividing each of the images into a plurality of adjacent non-overlapping tiles;
   extracting features with a CNN-configured processor by identifying regions of interest in each non-overlapping tile of the images; and
   based upon training from an expert, identifying, with a processor operating an attention network, trained characteristics in one or more of the regions of interest and providing identification data for at least a portion of the regions of interest to a user
   wherein the step of the processor operating the attention network comprises performing attention-based weighting of features relative to the trained characteristics, and
   wherein the attention network includes 3D convolutional filters of size N×d×d, where N is a depth of a filter kernel and d denotes a height and width of the kernel.

8. The method as set forth in claim 7 wherein the characteristics comprise at least one of visible tissue-related medical conditions, cancerous conditions and pre-cancerous conditions.

9. The method as set forth in claim 8 wherein the tissue is associated with a gastrointestinal tract of the patient.

10. The method as set forth in claim 7 further comprising a GPU that operates the step of extracting and that operates the attention network.

11. A non-transitory, computer-readable medium including program instructions that when executed by a computer processor perform the steps of:
    extracting, with a trained CNN, features from acquired image data, including images of the tissue on whole slides divided into a plurality of adjacent non-overlapping tiles, by identifying regions of interest in each of at least a portion of the tiles of the images; and
    based upon training from an expert, identifying, by operating an attention network, trained characteristics in the regions of interest and providing identification data for at least a portion of the regions of interest to a user through an interface,
    wherein the step of operating the attention network comprises performing attention-based weighting of features relative to the trained characteristics, and
    wherein the attention network applies 3D convolutional filters of size N×d×d to the regions of interest, where N is a depth of a filter kernel and d denotes a height and width of the kernel.

12. The non-transitory, computer-readable medium as set forth in claim 11 wherein the characteristics comprise at least one of visible tissue-related medical conditions, cancerous conditions and pre-cancerous conditions.

13. The non-transitory, computer-readable medium as set forth in claim 12 wherein the tissue is associated with a gastrointestinal tract of the patient.

14. The method as set forth in claim 7 wherein the processor includes a GPU that performs the extracting of features and the operating of the attention network.

15. The method as set forth in claim 7 wherein the image data of each whole slide is acquired using an image sensor having at least approximately 100 Megapixel resolution.

16. The non-transitory, computer-readable medium as set forth in claim 11 wherein the processor includes a GPU that performs the extracting of features and the operating of the attention network.

17. The non-transitory, computer-readable medium as set forth in claim 11 wherein the image data of each whole slide is acquired using an image sensor having at least approximately 100 Megapixel resolution.

* * * * *